April 2, 1963

R. CARLIN ET AL 3,083,781

CRAWLER TRACTOR SUSPENSION

Filed Feb. 15, 1961

Inventors
Robert Carlin
Craig W. Cannon
Ronald J. Foeteker
By Charles L. Schwab
Attorney April 2, 1963 R. CARLIN ET AL 3,083,781
CRAWLER TRACTOR SUSPENSION
Filed Feb. 15, 1961 3 Sheets-Sheet 3

Inventors
Robert Carlin
Craig W. Cannon
Ronald J. Soeteber
By Charles L. Schwab
Attorney

United States Patent Office 3,083,781
Patented Apr. 2, 1963

3,083,781
CRAWLER TRACTOR SUSPENSION
Robert Carlin, Milwaukee, and Craig W. Cannon and Ronald J. Soeteber, Waukesha, Wis., assignors to Allis-Chalmers Manufacturing Company, Milwaukee, Wis.
Filed Feb. 15, 1961, Ser. No. 89,456
5 Claims. (Cl. 180—9.5)

This invention relates to a suspension for a crawler tractor and more particularly relates to a conversion frame for mounting a unitary type main body on a pair of endless track mechanisms.

In manufacturing a crawler tractor for agricultural and industrial uses, it has been found desirable to utilize the unitary main body commonly used in rubber tired farm tractors so as to achieve the lowest possible cost to the user of the equipment. In using the unitary body, for instance, the engine and torque tube of a standard farm tractor, to produce a small crawler tractor, it has been found that the main body must be reinforced so as to more adequately withstand the vertical shock loading to which a crawler tractor is subjected. Also it has been found that excessive torsional loading of the torque tube, and engine may occur and the usual unitary farm tractor main body must be supplemented with structure to withstand such torsional loading.

It is an object of this invention to provide a suspension for a crawler tractor utilizing unitary engine and torque tube construction, whereby the torsional load will be divided between a plurality of connecting points between the suspension structure and the main body.

It is a further object of this invention to provide a suspension structure disposed intermediate the endless tracks and main body of the crawler tractor which reinforces the engine and torque tube components of the unitary main body and carries the radiator and radiator guard at its forward end.

It is a further object of this invention to provide a crawler tractor suspension as hereinbefore outlined, wherein the suspension structure is pivotally connected to the forward end of the engine.

These and other objects and advantages of this invention will become apparent to those familiar with the art when the following description is read in conjunction with the accompanying drawings in which:

FIG. 4 is an enlarged view of the pivot connection between the suspension structure and the front of the engine;

Figure 1:
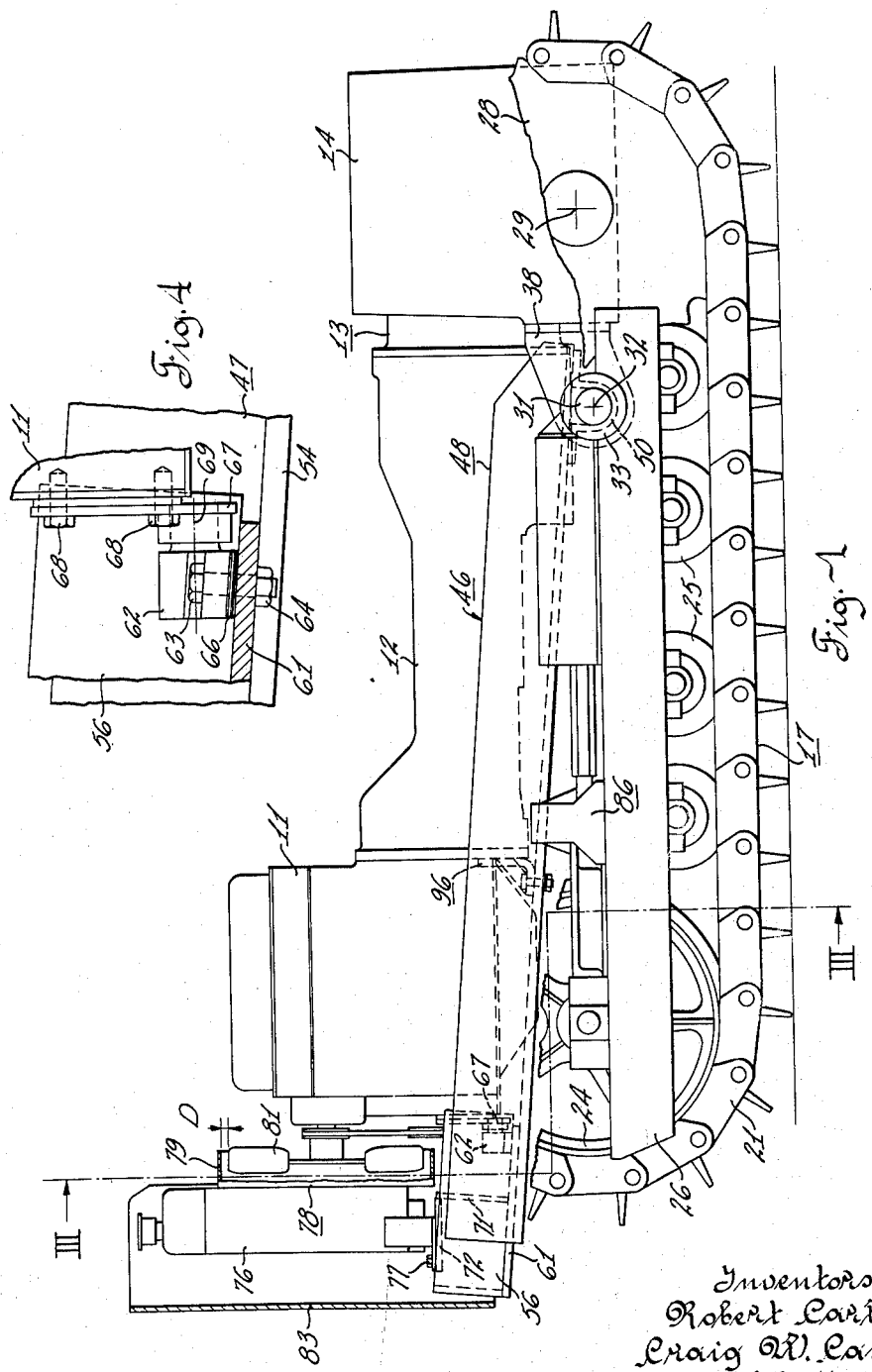
FIG. 1 is a side view of a crawler tractor in which this invention is incorporated, with parts of the tractor broken away.
Figure 2:
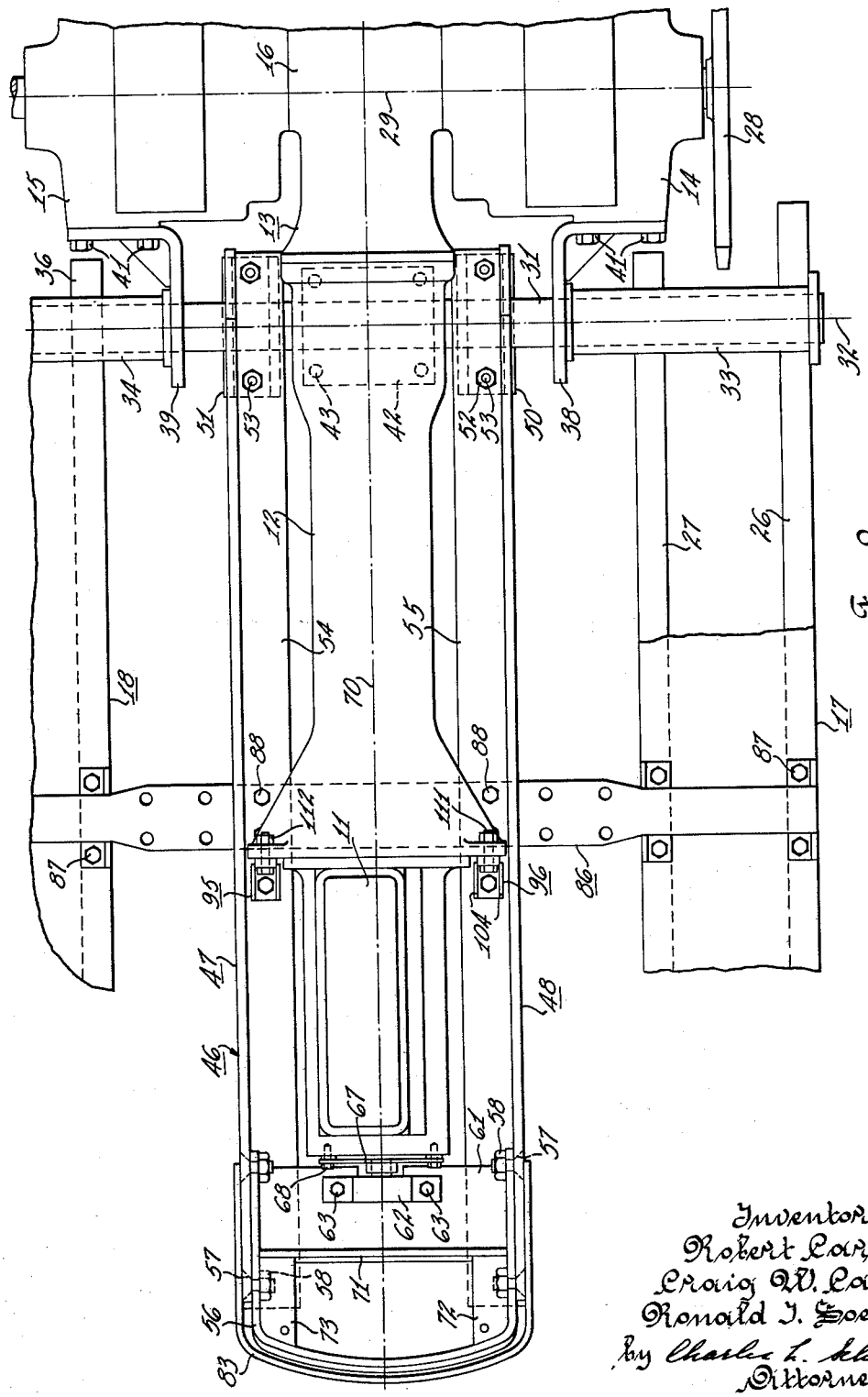
FIG. 2 is a top view of the crawler tractor shown in FIG. 1 with parts of the tractor broken away to show the structure incorporating this invention.

Referring to FIGS. 1 and 2, an engine 11 is secured rigidly to an intermediate housing in the form of a torque tube 12 by suitable means and the torque tube 12 is rigidly secured to a rear transmission housing assembly 13 by suitable means to form a unitary main body. The rear transmission housing includes left and right final drive housings 14 and 15 rigidly secured to laterally opposite sides of central rear housing 16.

Figure 3:
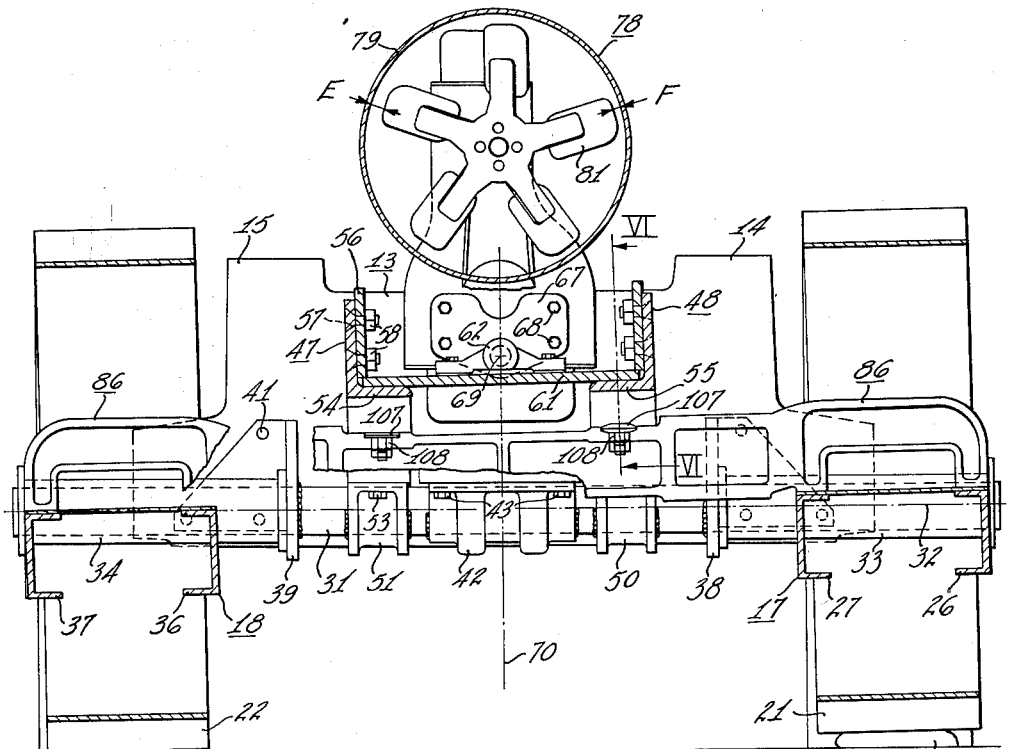
FIG. 3 is a section taken along the lines III—III of FIG. 1.

A pair of endless track mechanisms 17, 18 are disposed on laterally opposite sides of the tractor. Referring also to FIG. 3, endless track belts 21, 22 are of conventional construction and mounted for rotation about idlers, truck rollers, and final drive sprockets in a conventional manner. For instance, the endless track belt 21 rotates about an idler 24 and truck rollers 25, the idlers and truck rollers being secured to the pair of longiutdinally disposed channel members 26, 27, a sprocket 28 drives the endless track 21 in a conventional manner. The sprocket 28 is driven by the engine 11 through a power train, not shown, and rotates about an axis 29.

The suspension structure for mounting the main body of the tractor on the endless track mechanisms will now be described. Having reference to FIGS. 1, 2 and 3, a rear pivot axle 31, having an axis 32 in parallel forward spaced relation to axis 29, pivotally supports the rear ends of the channel members 26, 27, 36 and 37 of the endless track mechanisms through pivot housings 33, 34 rigidly secured to channels 26, 27 and 36, 37 of the endless track mechanisms 17, 18. The rear pivot axle is rigidly secured to the final drive housings 14, 15 through brackets 38, 39 secured to the housings 14, 15 by cap screws 41. The brackets 38, 39 are welded to the stationary rear axle 31.

Referring to FIGS. 2 and 3, a center bracket 42 is welded to the rear pivot axle 31 and secured to the underside of the torque housing 12 by a plurality of cap screws 43. Thus the rear pivot axle is rigidly secured to the main body of the tractor through the brackets 38, 39 and 42. The engine and torque tube components of the main body are cradled in a U-shaped conversion frame 46 which includes a pair of angles 47, 48 closely adjacent opposite sides of the main body. The rear end of the angle members are secured to the rear pivot axle by means of brackets 50, 51. The brackets 50, 51 are welded to the rear pivot axle 31 and are secured to the angles by nuts 52 and bolts 53.

A radiator and front pivot supporting portion of the suspension structure is secured to the front ends of the angles 47, 48 by bolts 57 and nuts 58. This front portion includes a U-shaped part 56, to which the angles 47, 48 are attached, and a bottom plate 61 secured as by welding to the U-shaped part 56. Referring, also to FIG. 4, a pin 62 is secured by bolts 63 and nuts 64 to the plate 61. Suitable shims 66 are provided between the plate 61 and the pin 62 so that slight deviations in manufacturing of the various parts of the conversion structure can be compensated for. The pivot pin housing 67 is secured to the front of the engine by cap screws 68. The pivot pin has an axis 69 which lies in the central vertical plane 70 of the crawler tractor.

The front portion of the suspension frame 46 includes a vertically disposed transverse plate 71 secured as by welding to the opposite sides of the U-shaped part 56 and to the bottom plate 61. The front portion also includes a pair of horizontally disposed radiator mounting plates 72, 73 secured by welding to the U-shaped part 56 and to the vertical plate 71. A conventional radiator 76 is secured to the radiator mounting plates 72, 73 by cap screws 77. A shroud 78 is installed on the rear side of the radiator 76 and terminates in a rearwardly extending cylindrical portion 79 with a predetermined clearance D with the engine fan 81. A wrap-around radiator guard 83 is secured by cap screws, not shown, to the vertical disposed flanges of angles 47, 48.

At this point in the description it is seen that the U-shaped frame 46 includes a pair of side members in the form of angles 47, 48 disposed closely adjacent to opposite sides of the main body components 11 and 12 and includes a radiator supporting structure at the forward end thereof, the forward end being pivotally connected through a pivot connection 62, 67 to the front end of the engine. It is also to be noted that the radiator guard 83 is rigidly secured to the U-shaped frame 46.

Figure 6:
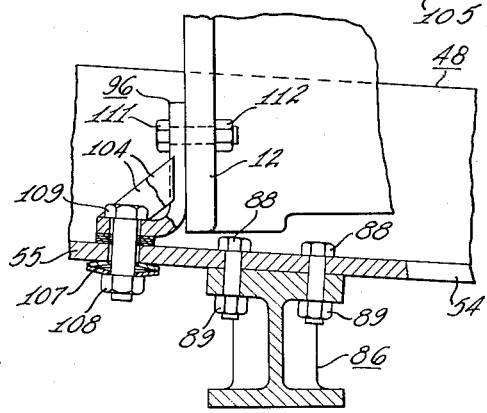
FIG. 6 is a section along the line VI—VI of FIG. 3 showing the connection between the front cross member and an angle member of the suspension structure.

A front transverse beam 86 is rigidly secured to the channel members 26, 27, 36, 37 by suitable means such as cap screws 87. The front transverse beam 86 is also rigidly secured to the angles 47, 48 by bolts 88 and nuts 89 as shown in FIG. 6.

By employing the angles 47, 48 to carry the radiator and radiator guard, it is possible to eliminate the engine side frames which are usually employed in the conventional farm tractor to support the front end of the engine and radiator. It has been found that if the front transverse member is rigidly secured to the engine or torque tube, the main body is subjected to an excessive amount of torsional loading resulting in excessive loading of engine and torque tube castings during operation. This invention effectively guards against excessive torsional loading of the unitary main body components extending forwardly from the rear transmission housing 13. A limited amount of twisting of the U-frame is permitted about pivot pin 62 thereby permitting a predetermined amount of torsional loading to pass the rear pivot axle 31 rather than through the forward extending portions 11, 12 of the main body. This is accomplished by use of lost motion connections between opposite sides of the torque tube 12 and the horizontal flanges 54, 55 of angles 47, 48.

When the suspension is subjected to torsional loading as shown in FIG. 3, a portion of the torsional loading will be transmitted to the main body through the rigid connections of the side members 47, 48 to the rear transmission housing assembly 13 and a portion is transmitted to the main body through the front pivot pin 62 and the bracket 96. A slight amount of torsional loading is caused by the resistance to flatting afforded by Belleville washers 107 associated with bracket 95 and when these washers are completely flattened then further torsional loading will cause additional torque to be transmitted to the torque tube 12 through brackets 95, 96.

Figure 5:
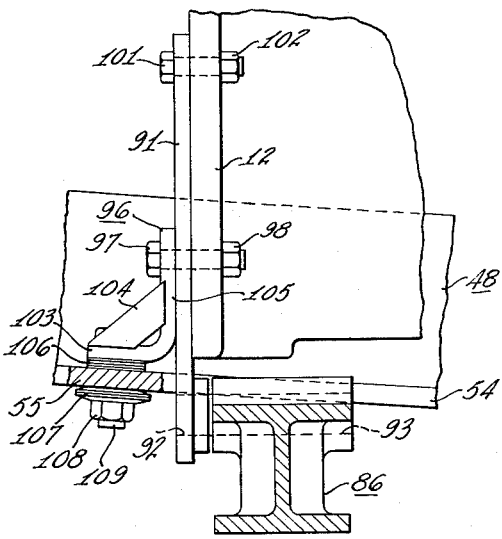
FIG. 5 is an enlarged section showing the connection between the suspension structure and an intermediate part of the main body.

Referring to FIG. 5, one version of the connection between the torque tube and the angles 47, 48 is illustrated. A vertically disposed U-shaped plate 91 presents a longitudinally disposed hole 92 aligned with a hole 93 in the front transverse support member 86. These two holes lie in one central vertical plane 70 and are provided for aligning the members of the conversion frame with the main body during initial assembly of the tractor. Brackets 95, 96 form a part of a lost motion connection between torque tube 12 and the central portion of the suspension mechanism. Bracket 96 is secured to the torque tube 12 through a bolt 97 and nut 98 which also passes through and secures the plate 91 to the torque tube. Additionally each leg of the plate 91 is secured to the flange portion of the torque tube 12 by means including bolt 101 and nut 102. Bracket 96 has a longitudinal portion 103 which is reinforced by braces 104 welded to the upright portion 105 of bracket 96 and the horizontal portion 103, thereof. As shown in FIGS. 2 and 6, these braces are placed on each transverse side of the bracket. Aligned holes are formed in bracket 96 and flange 55 and a plurality of shims 106 are interposed between angle 48 and bracket 96. By using shims 106 manufacturing deviations can be compensated for without resort to costly precise machining. A pair of Belleville washers 107 are interposed between the flange 55 and nut 108 secured to bolt 109. The Belleville washers 107 provide a resilient connection between an angle and bracket 96 and also permit a limited amount of lost motion therebetween so as to permit a limited amount of oscillation of the tracks about axis 32 through twisting of the U-frame 46. By use of a predetermined amount of lost motion a predetermined amount of torsional loading will be taken by the U-frame 46. The amount of lost motion can be varied for instance by varying the number of Belleville washers.

Referring to FIG. 6, a second embodiment of the connection between the torque tube 12 and angle members 96 is illustrated. In this embodiment, the U-plate 91 is eliminated and bracket 96 is secured directly to the flange of the torque tube 12 by a bolt 111 and nut 112. The construction of the bracket 96 and its connection to angle 48 is the same as that illustrated and described in reference to FIG. 5. FIG. 6 also illustrates the connection of the front transverse member 86 to angle 48, by bolts 88 and nuts 89. The transverse member 86 is similarly secured to angle 47 by a pair of bolts 88 and nuts 89. It should be understood that the connection between bracket 95 and angle 47 is the same as that between bracket 96 and angle 48.

Referring to FIG. 3, the endless track 21 is passing over a boulder 105. When this occurs, the end of the front transverse member 86 attached to the endless track frame mechanism 17 will be raised in relation to the other endless track frame 18 thereby resulting in a compression of Belleville washers 107 intermediate angle 47 and a nut 108. FIG. 3 shows these Belleville washers compressed, whereas the Belleville washers on the opposite side between angle 48 and a nut 108 are not compressed. When the front transverse member 86 is tilted as illustrated in FIG. 3, the U-frame 46 is distorted slightly thereby tilting the radiator 76 and radiator shroud 78 sideways to the condition illustrated. It will be noted that the clearance E is substantially greater than the clearance F at the side of the tractor having the raised track. The twisting of the U-frame occurs about the axis 69 of the pivot connection between the U-frame and the engine.

From the foregoing description of this invention, it is evident that applicants have provided an extremely novel crawler tractor suspension wherein a U-shaped suspension frame is pivotally connected to the front of the engine to permit torsional loading transmitted from the front transverse to the U-frame to be transmitted at least in part to the final drive housings through the rear connection of the U-frame to the final drive housings. Also the pivotal connection between the front of the engine and U-frame and the vertical load supporting connections through brackets 95, 96 and angles 47, 48 reinforce the main body to withstand vertical shock loading to which crawler tractors of this type are subjected. The side members in the form of angles 47, 48 are positioned closely adjacent to the main body, thereby leaving substantial space for inside mounted bulldozer beams or other tools which it is desired to mount between the angles 47, 48 and the endless track belts 21, 22.

This invention provides a semirigid mounting of the front of the endless tracks to the main body thereby providing the stability required for mounting attachments customarily used on crawler tractors. By using the U-shaped conversion frame to mount the radiator and radiator guard, the usual engine side frames for mounting the radiator may be eliminated. The U-frame also mounts a pivot connection for the front of the engine thereby strengthening the main body against vertical loading. The Belleville washers, nuts and bolts connecting the angles with the torque tube provide a lost motion connection between the U-frame and the central portion of the main body which permits a predetermined amount of torsional loading to bypass the main body through the rigid connection of the rear ends of the side members 47, 48 and rear of the main body, thus avoiding overstressing the torque tube or engine. Limiting the amount of twisting of the U-frame about axis 69 is necessary in order to provide the proper stability for the various attachments and to prevent the fan from contacting the shroud 78. This ingenious arrangement provides a low cost, rugged suspension for a crawler tractor which is particularly useful in agriculture and in various utility applications.

It should be understood that it is not intended to limit this invention to the exact details illustrated and described,

What is claimed is:

1. In a crawler tractor having a unitary main body including an engine, an intermediate housing and rear transmission housing, driving axles extending from said rear transmission housing transverse to said main body, and a pair of endless track mechanisms at opposite sides of said main body the combination comprising: means pivotally connecting the rear ends of said endless track mechanisms to said rear transmission housing forward of said driving axles, a front transverse member supported at its opposite ends on said endless track mechanisms, respectively, a suspension frame for supporting said main body including longitudinally disposed side members rigidly connected at their rear ends to said rear transmission housing and extending forwardly on opposite sides and closely adjacent to said main body, means rigidly interconnecting the forward ends of said side members, a radiator supporting structure secured to the forward ends, respectively, of said side members, a pivot connection between the forward end of said engine and the forward end of said suspension frame, a radiator mounted on said radiator supporting structure, means rigidly connecting said side members to said front transverse member, and means connecting an intermediate portion of said main body and an intermediate portion of said suspension frame.

2. In a crawler tractor having a unitary main body including an engine, an intermediate housing and rear transmission housing, driving axles extending from said rear transmission housing transverse to said main body, and a pair of endless track mechanisms at opposite sides of said main body the combination comprising: means pivotally connecting the rear ends of said endless track mechanisms to said rear transmission housing forward of said driving axles, a front transverse member supported at its opposite ends on said endless track mechanisms, respectively, a suspension frame for supporting said main body including longitudinally disposed side members rigidly connected at their rear ends to said rear transmission housing and extending forwardly on opposite sides and closely adjacent to said main body, means rigidly interconnecting the forward ends of said side members, a radiator supporting structure secured to the forward ends, respectively, of said side members, a pivot connection between the forward end of said engine and the forward end of said suspension frame, a radiator mounted on said radiator supporting structure, means rigidly connecting said side members to said front transverse member, and a connection between an intermediate portion of said main body and an intermediate portion of said suspension frame permitting a limited amount of oscillation of said endless track mechanisms relative to said main body.

3. In a crawler tractor having a unitary main body including an engine, an intermediate housing and rear transmission housing, driving axles extending from said rear transmission housing transverse to said main body, and a pair of endless track mechanisms at opposite sides of said main body and pivotally connected to said rear transmission housing forward of said driving axles, a suspension for said main body comprising: a front transverse member supported at its opposite ends on said endless track mechanisms, respectively; a suspension frame including longitudinally disposed side members rigidly connected at their rear ends to said rear transmission housing and extending forwardly on opposite sides and closely adjacent to said main body; means rigidly interconnecting the forward ends of said side members; means rigidly connecting said front transverse member to said side members intermediate the opposite ends of the latter; a radiator supporting structure on the forward end of said suspension frame; a pivot connection between the forward end of said engine and the forward end of said suspension frame; and a vertical load supporting connection between an intermediate portion of said main body and said suspension frame.

4. In a crawler tractor having a unitary main body including an engine, an intermediate housing and rear transmission housing, driving axles extending from said rear transmission housing transverse to said main body, and a pair of endless track mechanisms at opposite sides of said main body and pivotally connected to said rear transmission housing forward of said driving axles, a suspension for said main body comprising: a front transverse member supported at its opposite ends on said endless track mechanisms, respectively, a suspension frame including longitudinally disposed side members rigidly connected at their rear ends to said rear transmission housing and extending forwardly on opposite sides and closely adjacent to said main body, means rigidly interconnecting the forward ends of said side members, means rigidly connecting said front transverse member to said side members intermediate the opposite ends of the latter, a radiator supporting structure on the forward end of said suspension frame; a pivot connection between the forward end of said engine and the forward end of said suspension frame, and a vertical load supporting connection between an intermediate portion of said main body and an intermediate portion of said suspension frame, said load supporting connection permitting limited oscillation of said endless track mechanisms.

5. In a crawler tractor having a unitary main body including an engine, an intermediate housing and rear transmission housing, driving axles extending from said rear transmission housing transverse to said main body, and a pair of endless track mechanisms at opposite sides of said main body and pivotally connected to said rear transmission housing forward of said driving axles, the combination comprising: a suspension for said main body including a front transverse member supported at its opposite ends on said endless track mechanisms, respectively, a suspension frame including longitudinally disposed side members rigidly connected at their rear ends to said rear transmission housing and extending forwardly on opposite sides and closely adjacent to said main body, means rigidly interconnecting the forward ends of said side members, means rigidly connecting said front transverse member to said side members intermediate the opposite ends of the latter, and a radiator supporting structure on the forward end of said suspension frame; a pivot connection between the forward end of said engine and the forward end of said suspension frame; a vertical load supporting connection between an intermediate portion of said main body and said suspension frame; a radiator mounted on said radiator supporting structure; and a radiator guard rigidly secured to said suspension frame forward of said radiator.

References Cited in the file of this patent
UNITED STATES PATENTS

| | | |
|---|---|---|
| 1,564,739 | Winn | Dec. 8, 1925 |
| 2,091,464 | Baker et al. | Aug. 31, 1937 |
| 2,809,703 | Hayes | Oct. 15, 1957 |